US008440732B2

(12) United States Patent
Rajendran et al.

(10) Patent No.: US 8,440,732 B2
(45) Date of Patent: May 14, 2013

(54) POLYMERIC FOAMS WITH NANOCELLULAR MORPHOLOGY AND METHODS FOR MAKING THEM

(75) Inventors: Santhosh Kumar Rajendran, Tamilnadu (IN); Vikash Kumar Sinha, Karnataka (IN); Ravi Sriraman, Maharashtra (IN); Chinniah Thiagarajan, Karnataka (IN); Rajappan Vetrivel, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 811 days.

(21) Appl. No.: 12/054,773

(22) Filed: Mar. 25, 2008

(65) Prior Publication Data
US 2009/0247654 A1 Oct. 1, 2009

(51) Int. Cl.
*C08J 9/18* (2006.01)
*C08J 9/22* (2006.01)

(52) U.S. Cl.
USPC ............... 521/76; 521/79; 521/91; 521/122; 523/218

(58) Field of Classification Search .............. 521/76, 521/79, 91, 122; 523/219
See application file for complete search history.

(56) References Cited

U.S. PATENT DOCUMENTS

| | | | |
|---|---|---|---|
| 3,883,625 A | 5/1975 | Thomas et al. | |
| 4,025,687 A | 5/1977 | Wooler et al. | |
| 4,217,438 A | 8/1980 | Brunelle et al. | |
| 4,424,181 A * | 1/1984 | Senuma et al. | 264/54 |
| 4,664,681 A | 5/1987 | Anazawa et al. | |
| 4,766,036 A | 8/1988 | Vaughn et al. | |
| 4,782,098 A | 11/1988 | Allen et al. | |
| 4,857,390 A * | 8/1989 | Allen et al. | 428/220 |
| 4,882,363 A | 11/1989 | Neuhaus et al. | |
| 4,994,217 A * | 2/1991 | Banevicius et al. | 264/45.9 |
| 5,179,130 A | 1/1993 | Bland et al. | |
| 5,254,597 A | 10/1993 | Horn et al. | |
| 5,272,182 A | 12/1993 | Burnell | |
| 5,324,461 A | 6/1994 | Grohman | |
| 5,662,293 A | 9/1997 | Hower et al. | |
| 5,847,017 A * | 12/1998 | Brandt | 521/91 |
| 6,113,822 A | 9/2000 | Adedeji | |
| 6,284,810 B1 | 9/2001 | Burnham et al. | |
| 6,403,663 B1 | 6/2002 | DeSimone et al. | |
| 6,555,589 B1 | 4/2003 | Tan | |
| 6,555,590 B1 | 4/2003 | Tan | |
| 6,593,384 B2 | 7/2003 | Anderson et al. | |
| 6,767,501 B1 | 7/2004 | Kirjavainen | |
| 6,793,854 B1 | 9/2004 | Kirjavainen | |
| 6,884,377 B1 | 4/2005 | Burnham et al. | |
| 6,884,823 B1 | 4/2005 | Pierick et al. | |
| 2002/0117769 A1 * | 8/2002 | Arch et al. | 264/54 |
| 2002/0168509 A1 | 11/2002 | DeSimone et al. | |
| 2003/0105176 A1 | 6/2003 | Haas et al. | |
| 2003/0203156 A1 | 10/2003 | Hiraishi et al. | |
| 2003/0205832 A1 | 11/2003 | Lee et al. | |
| 2004/0082276 A1 | 4/2004 | Prasad | |
| 2004/0198853 A1 | 10/2004 | Saito et al. | |
| 2006/0127663 A1 | 6/2006 | Strey et al. | |
| 2006/0257594 A1 | 11/2006 | Haas et al. | |
| 2007/0045888 A1 | 3/2007 | Lee et al. | |
| 2007/0108465 A1 | 5/2007 | Pacholski et al. | |
| 2007/0202038 A1 * | 8/2007 | Yaghi et al. | 423/702 |
| 2008/0300331 A1 * | 12/2008 | Schellenberg et al. | 521/82 |
| 2009/0130420 A1 | 5/2009 | Thiagarajan et al. | |
| 2009/0148665 A1 | 6/2009 | Thiagarajan et al. | |
| 2009/0168176 A1 | 7/2009 | Sriraman et al. | |
| 2009/0269672 A1 | 10/2009 | Takita et al. | |
| 2009/0305030 A1 | 12/2009 | Sriraman et al. | |
| 2010/0326994 A1 | 12/2010 | Ichikawa et al. | |

FOREIGN PATENT DOCUMENTS

| | | |
|---|---|---|
| DE | 19610330 A1 | 9/1997 |
| EP | 0319866 A2 | 6/1989 |
| EP | 0545175 A2 | 6/1993 |
| EP | 1424124 A1 | 6/2004 |
| EP | 1296810 B1 | 9/2004 |
| GB | 1196128 A | 6/1970 |
| GB | 1562616 A | 3/1980 |
| JP | 64-43542 * | 2/1989 |
| JP | 2005055883 A | 3/2005 |
| JP | 2007261071 A | 10/2007 |
| WO | 9634039 A1 | 10/1996 |
| WO | 0018557 | 4/2000 |
| WO | 0241987 A2 | 5/2002 |
| WO | 2005092959 A1 | 10/2005 |
| WO | 2007142260 A1 | 12/2007 |

OTHER PUBLICATIONS

Hoffmann et al., "Silica-Based Mesoporous Organic-Inorganic Hybrid Materials", Angewandte. Chemie Int., vol. 45, 2006, pp. 3216-3251.
Kyo Sung Park et al., "PNAS: Exceptional Chemical and Thermal Stability of Zeolitic Imidazolate Frameworks," vol. 103, No. 27, Jul. 5, 2006, pp. 10186-10191.
Omar M. Yaghi et al., "Reticular Synthesis and the Design of New Materials," Nature, vol. 423, Jun. 12, 2003, pp. 705-714.
Paul Holister et al., "Nanotubes White Paper," CMP Cientifica; Jan. 2003; pp. 1-13.
Peter J.F. Harris, "Carbon Nanotubes and Related Structures; New Materials for the Twenty-First Century," Cambridge University Press, 1999; 23 pages.
SPI Chem™ Molecular Sieve Type 13X—1.0nm pore size; Website Address: http://www.2spi.com/catalog/spec_prep/molecular-sieve-type-13x.shtml; 2 pages; Sep. 28, 2006.
U.S. Appl. No. 11/623,910, filed Jan. 17, 2007.
Japanese Patent No. 2005055883 (A); Publication Date: Mar. 3, 2003; Abstract Only; 1 Page.

(Continued)

*Primary Examiner* — Irina S Zemel
(74) *Attorney, Agent, or Firm* — Cantor Colburn LLP (57) ABSTRACT

A foamable polymeric composition can comprise a polymer, a blowing agent cage material, and a blowing agent. The blowing agent cage material is selected from the group consisting of zeolite imidazolate framework, metal organic framework, carbon cage structure, and combinations comprising at least one of the foregoing. In one embodiment, the composition can be formed by mixing the polymer with the blowing agent cage material to form a mixture, introducing a blowing agent to the mixture, and forming the mixture into pellets.

22 Claims, 2 Drawing Sheets

OTHER PUBLICATIONS

International Publication No. 2005/092959 A1; International Publication Date: Oct. 6, 2005; Abstract Only; 1 Page.

International Publication No. 2007142260 (A1); Publication Date: Dec. 13, 2007; Abstract Only; 1 Page.

Japanese Patent No. 2007261071 (A); Publication Date: Oct. 11, 2007; Abstract Only; 1 Page.

Adhikari, Avishek, "A New Visual Cryptographic Scheme Using Latin Squares", IEICE Trans. Fundamentals, vol. E87-A. No. 5, Document No. XP-01196128, pp. 1198-1202, dated May 2004.

Database WPI Week 199049, Thomson Scientific, London, GB; AN 1990-364544, 2 pages.

International Search Report; International Application No. PCT/IB2008/000757; International Filing Date: Jan. 17, 2008; Date of Mailing: Apr. 6, 2009; 6 Pages.

Written Opinion of the International Searching Authority; International Application No. PCT/IB2008/000757; International Filing Date: Jan. 17, 2008; Date of Mailing: Apr. 6, 2009; 7 Pages.

International Search Report; International Application No. PCT/IB2008/052517; International Filing Date: Jun. 24, 2008; Date of Mailing: Oct. 31, 2008; 7 Pages.

Written Opinion of the International Searching Authority; International Application No. PCT/IB2008/052517; International Filing Date: Jun. 24, 2008; date of Mailing; Oct. 31, 2008; 7 Pages.

International Search Report; International Application No. PCT/IB2008/055216; International Filing Date: Dec. 10, 2008; Date of Mailing: Oct. 21, 2009; 7 Pages.

Written Opinion of the International Searching Authority; International Application No. PCT/IB2008/055216; International Filing Date: Dec. 10, 2008; Date of Mailing: Oct. 21, 2009; 8 Pages.

Wang, Zhonggang et al., "Hydrogen-Bonding in Cardo Copoly(aryl ether keton)s and Its Effects on the Gas Permeation Behavior" Document No. XP-002499699, Macromolecules 2007, 40, pp. 3238-3245, (c) 2007 American Chemical Society, Published on the Web Apr. 3, 2007.

German Patent No. 19610330A1; Publication Date: Sep. 18, 1997; Abstract Only; 1 Page.

International Search Report; International Application No. PCT/IB2008/051209; International Filing Date: Mar. 23, 2009; Date of Mailing: Aug. 5, 2009; 6 Pages.

Written Opinion of the International Searching Authority; International Application No. PCT/IB2008/051209; International Filing Date: Mar. 23, 2009; Date of Mailing: Aug. 5, 2009; 7 Pages.

Extended European Search Report; European Application No. 11172172.6; Date of Mailing: Oct. 17, 2011; 5 Pages.

* cited by examiner

POLYMERIC FOAMS WITH NANOCELLULAR MORPHOLOGY AND METHODS FOR MAKING THEM

BACKGROUND

This disclosure relates generally to polymeric foams with nanocellular morphology and methods of making the polymeric foams.

Polymer foams have been prepared by diffusing a polymer blowing agent and/or foaming agent into the desired polymer. Solubility of the polymer-blowing agent in the host polymer is a factor that can determine the cell size. Solubility is generally limited such that microcellular morphology is the smallest cell size attainable with various blowing agents and polymer systems. In the past, solubility was increased by use of a high-pressure gas injection system, which is relatively expensive due to the high-pressure requirements. A disadvantage of this process is that, when the polymer is made into pellets and shipped to customers, the gas diffuses out of the pellets, and further foaming using a conventional extruder without adding blowing agent is difficult.

Therefore, remains a need in the art for foamable polymer materials that can be pelletized and transported while retaining the ability to produce a nanocellular morphology.

BRIEF SUMMARY

The present disclosure generally provides for polymeric materials that can be further processed to produce nanocellular morphologies.

In one embodiment, the foamable polymeric composition can comprise a polymer, a blowing agent cage material, and a blowing agent. The blowing agent cage material is selected from the group consisting of zeolite imidazolate framework, metal organic framework, carbon cage structure, nanoporous gage structure, and combinations comprising at least one of the foregoing.

In one embodiment, the composition can be formed by mixing the polymer with the blowing agent cage material to form a mixture, introducing a blowing agent to the mixture, and forming the mixture into pellets.

The disclosure can be understood more readily by reference to the following detailed description of the various features of the disclosure and the examples included therein.

BRIEF DESCRIPTION OF THE DRAWINGS

Refer now to the figures, wherein the like elements are numbered alike.

DETAILED DESCRIPTION

Polymeric foams with nanocellular morphology are formed from a polymer, a blowing agent, and a blowing agent cage material such as a zeolite imidazolate framework, metal organic framework, carbon cage structure, and combinations comprising at least one of the foregoing. The blowing agent cage material can provide nucleation sites and enhance the blowing agent (e.g., carbon dioxide) absorption ability of the polymer. This is particularly beneficial in the fact that pellets comprising the polymer and blowing agent cage material can be formed and provided to a customer. These pellets retain their foaming ability such that, even after a period of greater than or equal to 30 days, and even greater than or equal to 360 days, the pellets can be formed into a polymeric foam having a nanocellular morphology (without the use of additional blowing agent). The pellets retain, for a period of greater than or equal to 30 days, or, specifically, greater than or equal to 360 days, and even more specifically, greater than or equal to 720 days, retain greater than or equal to 10 wt % blowing agent (wherein the weight percent blowing agent is the percent of weight gain due to the blowing agent (e.g., carbon dioxide). In other words, the polymer composition, for the above described period, retains greater than or equal to 10% (based on weight) of the weight gained due to the blowing agent, or, specifically, greater than or equal to 12%, and even more specifically, greater than or equal to 15%, and yet more specifically, greater than or equal to 30%. Therefore, if there is a 30% weight gain due to the blowing agent, and greater than or equal to 75% of the weight gain is retained, greater than or equal to 22.5% weight gain is retained.

In one embodiment, the foamable polymeric composition can comprise: a polymer; a blowing agent cage material; and a blowing agent. The a blowing agent cage material can be selected from the group consisting of zeolite imidazolate framework, metal organic framework, carbon cage structure, nanoporous gage structure, and combinations comprising at least one of the foregoing. The polymer composition is a solid and, after a period of greater than or equal to 1 week, the solid polymer composition, when maintained at 22° C. and 1 atm pressure, can, without the use of additional blowing agent, be formed into a foamed material having a nanocellular morphology. The composition can comprise a cell density of greater than or equal to $10^{12}$ cells/cm$^3$, or, specifically, $10^{12}$ cells/cm$^3$ to $10^{22}$ cells/cm$^3$, or, more specifically, $10^{15}$ cells/cm$^3$ to $10^{22}$ cells/cm$^3$. The nanocellular morphology can have an average pore cell size of 10 nm to 780 nm, or, specifically, 100 nm to 380 nm, or, in some embodiments, more specifically, 10 nm to 200 nm. The average cell size can be 1 nm to 10 nm. In some embodiments, the blowing agent cage material comprises a zeolite imidazolate framework and/or a metal organic hydrate. The blowing agent can comprise carbon dioxide. The period for which the polymer will still be capable of being formed into a foamed material having a nanocellular morphology can be greater than or equal to 30 days, or, specifically, greater than or equal to 360 days. The polymer composition can be in the form of pellets. Included herein are articles formed from the compositions, including wherein the composition is in the form of pellets and the article is formed by injection molding the pellets.

In one embodiment, the method for producing foamable polymeric composition, comprises: mixing a polymer with a blowing agent cage material to form a mixture, introducing a blowing agent to the mixture, and forming the mixture into pellets. The blowing agent cage material can be selected from the group consisting of zeolite imidazolate framework, metal organic framework, carbon cage structure, nanoporous gage structure, and combinations comprising at least one of the foregoing. The pellets can, after a period of greater than or equal to 1 week, the solid polymer composition, when maintained at 22° C. and 1 atm pressure, can, without the use of additional blowing agent, be formed into a foamed material having a nanocellular morphology. The mixture can have a weight gain of greater tan or equal to 10% due to the blowing agent, or, specifically, greater than or equal to 15%. The pellets can be formed by extrusion of the composition.

Simple foams can be produced from a 5% weight gain. Generally, as a polymeric material that has been infused with carbon dioxide, is stored and transported to a consumer, the carbon dioxide level decreased. As is clear from FIG. 1, microfoams can be formed at a carbon dioxide level of 5 wt % to 8 wt %. However, to attain a nanocellular morphology, the weight gain of the material is greater than or equal to 15 wt %, or, more specifically, greater than or equal to 25 wt %.

For the purposes of this disclosure, the term "nanoporous" and "nanocellular morphology" are hereinafter defined as an average pore cell size (as measured along a major diameter) of less than 1 micrometer, and having a cell density of greater than or equal to $10^{12}$ cells per cubic centimeter (cells/cm$^3$). Desirably, the nanocellular morphology has an average pore cell size of 1 nm to 780 nm, or, specifically, 10 nm to 380 nm, or, more specifically, 10 nm to 200 nm, and, in some embodiments, 1 nm to 10 nm. The number of cells per cubic centimeter is the cell density, which can be greater than or equal to $10^{12}$ cells/cm$^3$, or specifically, $10^{12}$ cells/cm$^3$ to $10^{22}$ cells/cm$^3$, or, more specifically, $10^{12}$ cells/cm$^3$ to $10^{22}$ cells/cm$^3$, yet more specifically $10^{15}$ cells/cm$^3$ to $10^{22}$ cells/cm$^3$, and even more specifically $10^{18}$ to $10^{22}$.

The term "blowing agent" is defined as a chemical agent that is used to foam a polymer. The blowing agent, also referred to herein as a foaming agent, can be a solid, a liquid, and/or a supercritical liquid. Suitable blowing agents that can be used include inorganic agents, organic agents and other chemical agents. Exemplary inorganic blowing agents include carbon dioxide, nitrogen, argon, water, air, nitrogen, and inert gases (such as helium and argon), as well as combinations comprising at least one of the foregoing. Exemplary organic agents include aliphatic hydrocarbons having 1-9 carbon atoms, aliphatic alcohols having 1-3 carbon atoms, and fully and partially halogenated aliphatic hydrocarbons having 1-4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane, and so forth. Partially halogenated chlorocarbons and chlorofluorocarbons include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123), 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Other chemical agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, trihydrazino triazine, and so forth. In one embodiment, the blowing agent can be carbon dioxide, air, nitrogen, argon, gaseous hydrocarbons, and combinations comprising at least one of the foregoing. The blowing agent can be solid carbon dioxide, liquid carbon dioxide, gaseous carbon dioxide, or supercritical carbon dioxide. Any of the inert gases, such as for example, helium, xenon, and argon can also be used. Non-limiting examples of gaseous hydrocarbons include methane, ethane, propane, and butane. In another embodiment, halohydrocarbons that would be expected to be in a gaseous form at ambient temperature and pressure can be used. Examples of such halohydrocarbons include fluorohydrocarbons, fluorocarbons, chlorocarbons, and chlorofluorocarbons.

In one embodiment, the process comprises melting and/or extruding the polymer composition and blowing agent cage material, saturating the molten polymer with a blowing agent, (e.g., carbon dioxide), optionally under pressure and at an elevated temperature, and subsequently inducing thermodynamic instability such as inducing a pressure decrease and/or temperature increase to promote bubble nucleation in the polymeric material. Foaming can then be quenched by immersion of the polymer in a suitable medium to stabilize the nanocellular morphology, e.g., immersion in a cold medium (e.g., water). Alternatively, a continuous melt extrusion method of foaming can be used. As used herein, the term "nucleation" is generally defined as a process by which a homogeneous solution of polymeric material and dissolved molecules of a species that is a gas under ambient conditions undergoes formations of clusters of molecules of the species that define "nucleation sites" from which cells will grow; i.e., it is a change from a homogeneous solution to a multi-phase mixture in which, throughout the polymeric material, sites of aggregation of at least several molecules of carbon dioxide gas bubbles are formed.

To form nanocellular morphology, the diffused blowing agent content in the polymer composition (i.e., the polymer and the blowing agent cage material) is greater than or equal to 15% gain by weight of carbon dioxide, or, specifically, greater than or equal to 20% gain by weight of carbon dioxide, or, more specifically, greater than or equal to 30%, and, yet more specifically, greater than or equal to 35% gain by weight of carbon dioxide at room temperature and 60 bar pressure.

Figure 1:
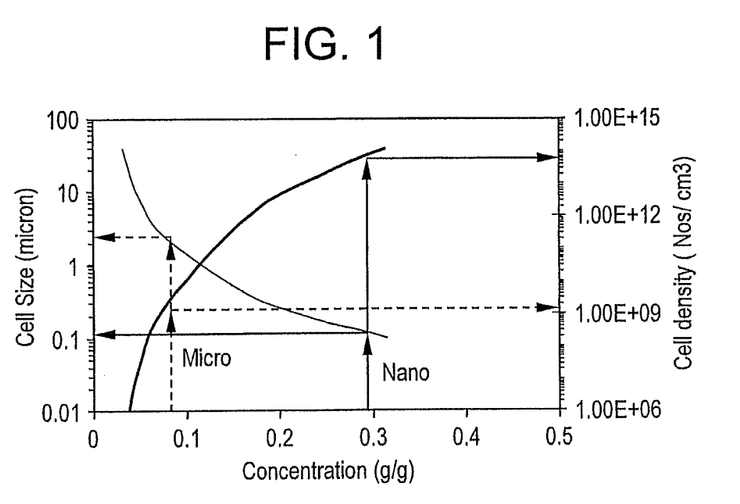
FIG. 1 graphically illustrates carbon dioxide gas concentration as a function of cell size and cell density in a polycarbonate.

As is seen in FIG. 1, an increase in carbon dioxide concentration results in higher cell density and smaller cell size. At concentrations greater than 10%, cell size was less than 1 micrometer and steadily decreased as a function of concentration. Similarly, cell density increased as a function of increased carbon dioxide concentration in the polymer.

The polymers can include those that have an affinity for carbon dioxide. Where transparency is desired, e.g., an advantage of nano foam can be its transparency, the use of a transparent polymer is desirable. Some exemplary polymers can comprise thermoplastics such as polyalkylenes (e.g., polyethylene, polypropylene, polyalkylene terephthalates (such as polyethylene terephthalate, polybutylene terephthalate)), polycarbonates, acrylics, polyacetals, styrenes (e.g., impact-modified polystyrene, acrylonitrile-butadiene-styrene, styrene-acrylonitrile), poly(meth)acrylates (e.g., polybutyl acrylate, polymethyl methacrylate), polyetherimide, polyurethanes, polyphenylene sulfides, polyvinyl chlorides, polysulfones, polyetherketones, polyether etherketones, polyether ketone ketones, and so forth, as well as combinations comprising at least one of the foregoing. Exemplary thermoplastic combinations comprise acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyethylene/nylon, polyethylene/polyacetal, and the like. In a specific embodiment a polycarbonate, such as those designated by the trade name Lexan®, which are commercially available from the SABIC Innovative Plastics US LLC, Pittsfield, Mass., can be employed as the polymer.

In one embodiment, polycarbonates having desirable properties for the intended application e.g., foamed polymer sheet, are synthesized, wherein the polycarbonates include structural units of Formula (I):

(I)

which are derived from 2-hydrocarbyl-3,3-bis(4-hydroxyaryl)phthalimidine; wherein $R^1$ and $R^2$ are as described previously; and the C=O structural units are derived from a C=O donor such as phosgene or a carbonic acid diester.

The polycarbonate composition can further comprise structural units derived from at least one other aromatic dihydroxy compound such as is represented by the general Formula (II):

(II)

wherein each $G^1$ is an independently aromatic group; E is selected from the group consisting of an alkylene group, an alkylidene group, a cycloaliphatic group, a sulfur-containing linkage group, a phosphorus-containing linkage group, an ether linkage group, a carbonyl group, a tertiary nitrogen group, and a silicon-containing linkage group; $R^3$ is a hydrogen or a monovalent hydrocarbon group each; $Y^1$ is independently selected from the groups consisting of a monovalent hydrocarbyl group, an alkenyl group, an allyl group, a halogen, an oxy group and a nitro group; each m is independently a whole number from zero through the number of positions on each respective $G^1$ available for substitution; p is a whole number from zero through the number of positions on E available for substitution; t is a natural number greater than or equal to one; s is either zero or one; and u is a whole number.

Examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, and adamantylidene; a sulfur-containing linkage such as sulfide, sulfoxide or sulfone, a phosphorus-containing linkage such as phosphinyl, phosphonyl, an ether linkage, a carbonyl group, a tertiary nitrogen group, and a silicon-containing linkage such as a silane or siloxy linkage.

In the aromatic dihydroxy comonomer compound shown in Formula (II), when more than one $Y^1$ substituent is present, they can be the same or different. The same holds true for the $R^3$ substituent. Where "s" is zero in Formula (II) and "u" is not zero, the aromatic rings are directly joined with no intervening alkylidene or other bridge. The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some embodiments, the parameters "t", "s", and "u" are each one; both $G^1$ radicals are unsubstituted phenylene radicals; and E is an alkylidene group such as isopropylidene. In particular embodiments, both $G^1$ radicals are p-phenylene, although both can be ortho- or meta-phenylene or one ortho- or meta-phenylene and the other para-phenylene.

Some illustrative examples of aromatic dihydroxy compounds of Formula (II) include the dihydroxy-substituted aromatic hydrocarbons disclosed by name or Formula (generic or specific) in U.S. Pat. No. 4,217,438. Some particular examples of aromatic dihydroxy compound comonomers include, but are not intended to be limited to, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl) methane, 1,1-bis(4-hydroxyphenyl)ethane, 1,1-bis(4-hydroxy-2-chlorophenyl)ethane, 2,2-bis(4-hydroxyphenyl) propane (bisphenol A); 2,2-bis(3-chloro-4-hydroxyphenyl) propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl) cyclohexylmethane, 2,2-bis(4-hydroxyphenyl)-1-phenylpropane, 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4- hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(4'-hydroxy-3'methylphenyl) cyclohexane (DMBPC), 1,1-bis(3,5-dimethyl-4-hydroxyphenyl)cyclohexane; 4,4'-[1-methyl-4-(1-methyl-ethyl)-1, 3-cyclohexandiyl]bisphenol (1,3 BHPM), 4-[1-[3-(4-hydroxyphenyl) -4-methylcyclohexyl]-1-methyl-ethyl]-phenol (2,8 BHPM), 3,8-dihydroxy-5a,10b-diphenylcoumarano-2', 3',2,3-coumarane (DCBP), 2-phenyl-3,3-bis(4-hydroxyphenyl)phthalimidine, 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis (3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3, 5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane, 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene) diphenol, 4,4'-bis(3,5-dimethyl)diphenol, 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, 1,4-bis(2-(4-hydroxy-3-methylphenyl)-2-propyl)benzene 2,4'-dihydroxyphenyl sulfone, 4,4'-dihydroxydiphenylsulfone (BPS), bis(4-hydroxyphenyl)methane, 2,6-dihydroxy naphthalene; hydroquinone; resorcinol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2', 2'-tetrahydro-3,3,3,3'-tetramethyl-1,1'-spirobi[1H-indene]-6,6'-diol. The most typical aromatic dihydroxy compound is Bisphenol A (BPA).

In some embodiments, an isosorbide comonomer can be used with the 2-hydrocarbyl-3,3-bis(4-hydroxyaryl)phthalimidine monomer to produce polycarbonate copolymers. Isosorbide, sometimes also called 1,4:3,6-dianhydo-D-glucitol, is a rigid, chemically, and thermally stable aliphatic diol that tends to produce copolymers having higher glass transition temperatures, as compared to comonomer compositions which do not include isosorbide.

The carbonic acid diester described above has the general Formula (III):

$$(ZO)_2C=O \qquad (III),$$

wherein each Z is independently an unsubstituted or substituted alkyl radical, or an unsubstituted or substituted aryl radical. Suitable examples of carbonic acid diesters include, but are not intended to be limited to, ditolyl carbonate, m-cresyl carbonate, dinaphthyl carbonate, diphenyl carbonate, diethyl carbonate, dimethyl carbonate, dibutyl carbonate, dicyclohexyl carbonate, and combinations of two or more carbonic acid diesters thereof. Diphenyl carbonate is widely used as a carbonic acid diester due to its low cost and ready availability on a commercial scale. If two or more of the carbonic acid diesters listed above are utilized, preferably one of the carbonic acid diesters is diphenyl carbonate Suitable carbonic acid diesters include the group of "activated aromatic carbonates". As used herein, the term "activated aromatic carbonate" is defined as a diaryl carbonate that is more reactive than diphenyl carbonate in a transesterification reaction. Such activated aromatic carbonates can also be represented by Formula (III), wherein each Z is an aryl radical having 6 to 30 carbon atoms. More specifically, the activated carbonates have the general Formula (IV):

(IV)

wherein Q and Q' are each independently an ortho-positioned activating group; A and A' are each independently aromatic rings which can be the same or different depending on the number and location of their substituent groups, and a and a' is zero to a whole number up to a maximum equivalent to the number of replaceable hydrogen groups substituted on the aromatic rings A and A' respectively, provided a+a' is greater than or equal to 1. $R^4$ and $R^5$ are each independently substituent groups such as alkyl, substituted alkyl, cycloalkyl, alkoxy, aryl, alkylaryl, cyano, nitro, or halogen. The term b is zero to a whole number up to a maximum equivalent to the number of replaceable hydrogen atoms on the aromatic ring A minus the number a, and the number b' is zero to a whole number up to a maximum equivalent to the number of replaceable hydrogen atoms on the aromatic ring A' minus the number a'. The number, type and location of $R^4$ or $R^5$ on the aromatic ring is not intended to be limited unless they deactivate the carbonate and lead to a carbonate that is less reactive than diphenyl carbonate.

Non-limiting examples of suitable ortho-positioned activating groups Q and Q' include (alkoxycarbonyl)aryl groups, (arylketone)aryl groups, halogens, nitro groups, amide groups, sulfone groups, sulfoxide groups, or imine groups with structures indicated below:

wherein X is halogen or $NO_2$; M and M' independently comprises N-dialkyl, N-alkyl aryl, alkyl, or aryl; and $R^6$ is alkyl or aryl.

Specific non-limiting examples of activated aromatic carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Unsymmetrical combinations of these structures, wherein the substitution number and type on A and A' are different, are also contemplated. A preferred structure for the activated aromatic carbonate is an ester-substituted diaryl carbonate having the Formula (V):

wherein $R^7$ is independently at each occurrence a $C_1$-$C_{20}$ alkyl radical, $C_4$-$C_{20}$ cycloalkyl radical, or $C_4$-$C_{20}$ aromatic radical; $R^8$ is independently at each occurrence a halogen atom, cyano group, nitro group, $C_1$-$C_{20}$ alkyl radical, $C_4$-$C_{20}$ cycloallyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and c is independently at each occurrence an integer 0-4. At least one of the substituents $CO_2R^5$ is preferably attached in the ortho position of Formula (V).

Examples of ester-substituted diaryl carbonates include, but are not limited to, bis(methylsalicyl)carbonate (CAS Registry No. 82091-12-1) (also known as BMSC or bis(o-methoxycarbonylphenyl)carbonate), bis(ethyl salicyl)carbonate, bis(propyl salicyl) carbonate, bis(butylsalicyl) carbonate, bis (benzyl salicyl)carbonate, bis(methyl 4-chlorosalicyl)carbonate and the like. In one embodiment, BSMC is used in melt polycarbonate synthesis due to its lower molecular weight and higher vapor pressure.

A number of polymerization methods can be used for producing the polymer, such as a homopolycarbonate or a copolycarbonate, comprising structural units derived from a 2-hydrocarbyl-3,3-bis(4-hydroxyaryl)phthalimidine. Methods for fabricating polycarbonates, for example, include a melt transesterification polymerization method, an interfacial polymerization method, and a bischloroformate polymerization method.

Additive(s) can be employed to modify the performance, properties, or processing of the polymer, so long as the additive(s) do not adversely affect the blowing agent cage material and/or blowing agent (e.g., by inhibiting foaming). Exemplary additives comprise antioxidants, such as, organophosphites, for example, tris(nonyl-phenyl)phosphite, tris(2,4-di-t-butylphenyl)phosphite, bis(2,4-di-t-butylphenyl) pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, fibers, glass fibers (including continuous and chopped fibers), mica and other additives; such as, for example, mold release agents, UV absorbers, stabilizers (such as light stabilizers, thermal stabilizers, and others), lubricants, plasticizers, pigments, dyes, colorants, anti-static agents, flame retardants, impact modifiers, among others, as well as combinations comprising at least one of the foregoing. For example, the additive can be a taggant such as a security taggant (e.g., a fluorescent dye). Infrared (IR) absorber(s) can also be used, such as amines, antimony salts, heteropoly acids, lanthanum boroxide, and others, as well as combinations comprising at least one of the foregoing. The amount of infrared absorbers can be 0.005 weight percent (wt %) to 0.5 wt %, or, specifically, 0.01 wt % to 0.1 wt %, based upon a total weight of the polymer composition.

Additive(s) for controlling pore size distribution can also be used for different applications. Additives or cell control agents influence the nucleation of foam cells by altering surface tension of the polymer composition or by serving as nucleation sites from which cells can grow. Some possible additives include talc (magnesium silicate), clay, glass-fibers, fumed silica, titanium dioxide, a mixture of citric acid and sodium bicarbonate, zinc oxide, and so forth, as well as combinations comprising at least one of the foregoing.

The blowing agent cage material can be a material capable of sufficiently enhancing blowing agent solubility and/or retention in the polymer composition such that a nanocellular morphology can be produced directly from the polymer composition even after a period of greater than or equal to 1 week, or, specifically greater than or equal to 30 days, and even greater than or equal to 90 days when maintained at room temperature (22° C.) and atmospheric pressure (1 atmosphere (atm)); (i.e., without the use of additional blowing agents or foaming materials, and the like, and even without sealing the composition in a container). Under the same conditions, i.e., without using a sealed container, additional blowing agents, and/or other materials and techniques, other materials that have been imbibed with carbon dioxide would maintain the ability to produce nanocellular morphology for a period of less than 24 hours. Actually, other common foaming materials imbibed with carbon dioxide, even in a sealed container generally maintain the ability to produce nanocellular morphology for a period of less than 24 hours.

Exemplary blowing agent cages include materials such as zeolite imidazolate framework ("ZIF", e.g., zeolite A imidazolate), e.g., ZIF-1 to ZIF-12; metal organic frameworks ("MOF"), include, metal organic hydrates (MOH), e.g., MOH-48; carbon cage structures (e.g., single wall an multi-wall carbon nanotubes, allotropes of carbon, carbon bucky ball, carbon and/or graphite foam, and so forth) and other nanoporous gage structures (e.g., Zeolite-13X, Zeolite 4A); and combinations comprising at least one of the foregoing. Exemplary ZIFs include those with a size greater than the kinetic diameter size of the blowing agent (e.g., $CO_2$) and less than the size of the polymer foam pore size. In some embodiments, the zeolite can have a pore size of 1 Angstroms (Å) to 20 Angstroms. The zeolite particle size can be of less than or equal to 200 nanometer (nm), or, specifically, 0.5 nm to 200 nm, and more specifically, 1 nm to 100 nm. Exemplary zeolites include SPI-Chem™ Molecular Sieve Type 13X, Type 4A, and SYLOSIV® Molecular Sieve Powder, all commercially available from Aldrich Chemical Company, Milwaukee, Wis.). Exemplary ZIFs are discussed in *PNAS: Exceptional Chemical and Thermal Stability of Zeolitic Imidazolate Frameworks*, by Kyo Sung Park et al., Vol. 103, No. 27, pp. 10186-10191 (Jul. 5, 2006).

Metal organic frameworks have a combination of a metal network and polymeric chains; e.g., they are organic-inorganic hybrid material. Polymeric chains surround the metal network. Because of this structure, these material generates very high surface area and porous structure having a small pore size; e.g., less than 100 nm, specifically, less than 50 nm, and even 2 nm to 15 nm. These materials can be formed using mixture of metal compound with polymer network, and evaporating it in a suitable media at predetermined temperature. The surface area can be as high as 4,500 m$^2$/gm and pore size as low as 2 nm. One such exemplary material is described in "*Silica-Based Mesoporous Organic-Inorganic Hybrid Material*", by Hoffmann et al., Angew. Chemie Int., Vol. 45, pp. 3216-3251 (2006). An exemplary MOF commercially available from BASF is BASACUBE.

The very small pore inside the metal organic framework allows very high storage capacity of $CO_2$ and $H_2$. The $CO_2$ storage capacity of 140 wt % (based upon the initial weight of the polymer composition without the carbon dioxide) is believed possible. Hence, these materials can provide very high $CO_2$ concentration in a polymer, enabling a very high nucleation density (greater than or equal to $10^{14}$ cells/cm$^3$, e.g., $10^{14}$ cells/cm$^3$ to $10^{22}$ cells/cm$^3$) and/or small cell size (less than 1 micrometer). Exemplary MOFs include, metal organic hydrate 48, and others. Some MOFs are described in *Reticular Synthesis and the Design of New Materials*, by Omar M. Yaghi et al., Nature, Vol. 423, pp 705-714 (Jun. 12, 2003).

Similar to the metal organic frameworks, single-wall and multi-wall carbon nanotubes can hold a large quantity of hydrogen because of their hollow structure. Hence, the nanotubes can be used alternatively or in combination with above materials to attain a desired gas concentration in the polymer. Exemplary carbon nanotubes are described in *Nanotubes White Paper*, by Paul Holister et al., CMP Cientifica, pp. 1-13 (2003), and in *Carbon Nanotubes and Related Structures; New Materials for the Twenty-first Century*, by Peter J. F. Harris, Cambridge University Press, (1999).

The polymer composition can comprise 40 wt % to 99 wt % polymer and 1 wt % to 60 wt % blowing agent cage material, based upon a total weight of the polymer composition (i.e., polymer, blowing agent cage material, and any fillers and additives, but excluding the blowing agent(s)), or, specifically, 90 wt % to 99 wt % polymer and 1 wt % to 10 wt % blowing agent cage material, and/or, more specifically, 96 wt % to 99 wt % polymer and 1 wt % to 5 wt % blowing agent cage material. The additives can optionally be present in an amount of less than or equal to 10 wt %, based upon a total weight of the polymer composition, or, specifically, 0.005 wt % to 5 wt %, or, more specifically, 0.05 wt % to 3 wt %.

Once the desired polymer composition having polymer and the blowing agent cage material is formed, various techniques can be employed to form the foamed polymer articles, including a continuous process or a batch process. The batch process is primarily used for making foams with very specific properties or in smaller volumes per batch. The continuous process, however, allows high-output conducive to production scale operations. In one embodiment, the continuous process uses an extruder, e.g., a single screw-extruder or a tandem set-up. Either approach can use co-rotating twin-screws. The process generally comprises introduction of polymeric material and any additive(s) to the throat of the extruder, melting of the polymeric material, dissolution of a blowing agent (e.g., carbon dioxide) in the melted polymeric material, optional plasticization of the polymeric material if needed to depress the glass transition temperature; nucleation of bubbles (e.g., due to pressure drop or temperature increase at die), bubble growth after die; and cell structure stabilization such as by cooling such as by immersion in a cold medium e.g., water).

Desirably, cells nucleate at a density of $10^9$ to $10^{18}$ cells per cubic centimeter and grow simultaneously at the same speed in all directions to produce a foamed article. In one embodiment, the average cell size, as measured along a major diameter, is 1 nanometer (nm) to less than 1,000 nanometers, or, specifically, 1 nanometers to 500 nanometers, or, more specifically, 1 nanometers to 300 nanometers, and, yet more specifically, 10 nanometers to 100 nanometers Since the polymer composition maintains sufficient blowing agent for subsequent foaming, the blowing agent can be introduced into the polymer composition while the composition is in a molten state, forming a foamable precursor. The foamable precursor can then be formed into a desired shape, e.g., pelletized. The pellets can then be stored and/or shipped for later use. To further minimize $CO_2$ diffusion out of the material (e.g., pellets), the material can be stored in a sealed container (e.g., a vacuum sealed container), such as a metal seal, metal coated polymer bag and/or metal coated cover. The pellets can later be foamed by the customer. Foaming can comprise melting the pellets, forming the molten material into a desired shape, and nucleating the bubbles, as described above.

The foamed articles can be in the form of a sheet or a three dimensional object. The foamed articles can be used in a wide variety of automotive and industrial applications. Exemplary applications include display and optical sheets, biomedical applications, transparent glazing applications, sandwich panels, energy absorbing parts, and the like. In one embodiment, the nano-cellular foam can be used for producing foam sheets or foam panels, some examples of which include an integrated sandwich panel, a co-laminated panel, a co-extruded panel comprising an inner foam sheet, graded foam sheets, co-extruded foam sheets, corrugated foam sheets, multi-wall foam sheets, an integral sheet structure comprising a foam sheet and a reinforced skin as a top layer, and a multi-wall sheet structure comprising at least one foam sheet disposed between two or more plastic sheets. The foamed product can also comprise an energy absorbing material, a packaging material, a thermal insulation material, an acoustic insulation material, a building construction material, or a building glazing material. Foam products comprising the energy absorbing material can be fabricated into various articles, such as automobile bumpers, which are sometimes required to be softer for pedestrian safety while also be able to meet barrier regulations. Transparent sheets comprising the nano-cellular foams can also be used as light diffusers, such as for example, display device diffusers. Some specific application areas for insulating foam include for example, buildings, refrigerators and refrigeration systems, heaters and heating systems, ventilation systems, air conditioners, ducting systems for transporting hot or cold materials, such as for example liquids, air, and other gases; and cold rooms. Insulating foamed structures can also be used for making high temperature turbine parts, such as for example, turbine blades. Structural and insulation foamed structures are used in building and construction panels, including opaque insulating sandwich panels. Some examples of applications of the nano-cellular polymer foams as a material having both structural properties and transparency include roof glazings, building glazings, construction glazings, automotive glazing. In some instances, a combination of the structural, thermal, and transparency properties of the foamed structures can also be used for many construction applications. Insulating foams comprising a flame retardant can also be useful for producing sandwich cores, which can be used for producing panels for use in air and surface transportation means, such as aircrafts, helicopters, trains, buses, ships, recreational vehicles, and the like. Ultra-low density nano-cellular polymer foams, that is foams having a density that is 1-10 percent of the bulk density of the polymer of which the foam is made of, can be used as sandwich panels having superior structural and thermal properties. In another embodiment, panels or sheets comprising the nano-cellular polymer foams can comprise an airplane or an automobile outer structural component, a roof, a greenhouse roof, a stadium roof, a building roof, a window, a skylight, or a vehicular roof. Other applications of the nano-cellular polymer foam include those where they can comprise coating applications, for example, a conductive packaging material, an aircraft fuselage insulating material for noise and thermal insulation, a fuel tank coating, an aircraft fuel tank coating, an automotive fuel tank coating, and fuel storage tank coating. Further, the foams can comprise gas mixers, gas diffusers, liquid-gas separators, compact heat exchangers, and orthopedic devices. Furthermore, the foam can comprise a membrane, a sensing device, a floating structure or a weatherable exterior panel. Some examples of specific floating structures include floating docks, marinas, fishing boats, life rafts, ship hulls, life belts, life jackets, and navigation buoys.

The disclosure is explained in more detail with reference to the following non-limiting Examples, which are intended to be illustrative, not limitative.

EXAMPLES

Example 1

Polycarbonate (namely Lexan 105 commercially available from SABIC Innovative Plastics, Pittsfield, Mass.), was studied (via simulations) to predict carbon dioxide weight gain with no zeolite (Sample 1), 10 wt % zeolite (Sample 2), and 25 wt % zeolite (Sample 3), wherein the weight percents are the total weight of the polymer composition (polymer (Lexan 105), and zeolite). The experimental were also conducted to show the weight gain. The zeolite was compounded with the polymer. The compounded zeolite and polycarbonate samples were saturated for measuring the weight gain of the combined system. The process conditions included a saturation time of 72 hours, room temperature (e.g., 27° C.), and a saturation pressure of 58 bar. It was unexpectedly discovered that a greater than three times as much weight gain could be obtained with Sample 3 versus Sample 1 (i.e., 1.4 grams of weight gain for zeolite plus polycarbonate versus 0.3 grams for only polycarbonate).

Example 2

Figure 2:
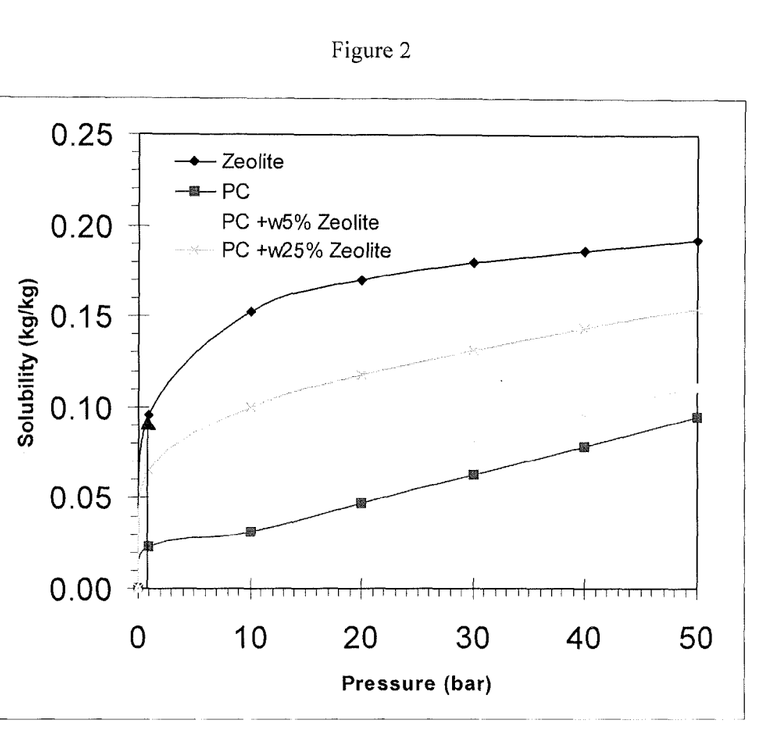
FIG. 2 graphically illustrates carbon dioxide gas weight gain as a function of time for a polycarbonate, zeolite, and polycarbonate comprising zeolite.

Here, polycarbonate was again simulated with a zeolite to compare the pure zeolite (Sample 4), polycarbonate with no zeolite (Sample 1), polycarbonate comprising 5 wt % zeolite (Sample 5), and polycarbonate comprising 25 wt % zeolite (Sample 3), wherein the zeolite was SPI-Chem™ Molecular Sieve Type 13X. At around 50 bar and 25 wt % zeolite, a 17% increase in solubility by weight was predicted (by volume, 41% increase). It was also noted, at room temperature (22° C.) and atmospheric pressure (1 bar), a $CO_2$ solubility of 10% is observed (i.e., percent weight gain of the polycarbonate composition due to the carbon dioxide) was attained for Sample 3, while Sample 1 had a less than 3% $CO_2$ solubility at room pressure (about 1 bar). (See FIG. 2)

Example 3

Figure 3:
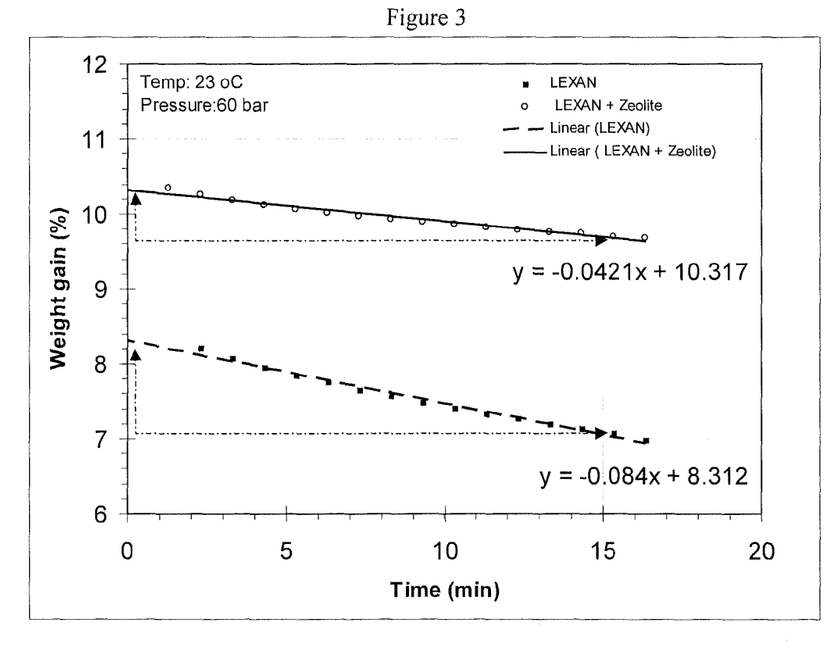
FIG. 3 graphically illustrates carbon dioxide gas weight gain and desorption data for polycarbonate and polycarbonate plus zeolite system.

(See FIG. 3). A polycarbonate (Sample A) and a polycarbonate with 1 wt % zeolite (Sample B) was saturated with $CO_2$ at 60 bar and room temperature (24° C.) for 168 hours. The weight gain for Sample A was 8.312%, and for Sample B was 10.317%. This illustrates substantial weight improvement of Sample B of around 23% compared Sample A. FIG. 3 also illustrates the desorption of $CO_2$ out of the samples in terms of loss in weigh gain. A linear fit is used to compare the gas loss rate. Sample A shows a desorption rate of 0.084 per minute. Sample B shows a desorption rate of 0.0421 per minute. This shows that the desorption rate of Sample B is 50% slower than Sample A. These samples support that there is an increase in gas solubility and reduction in gas loss.

Due to the polymer composition and its ability to retain the blowing agent over time, the polymer composition can be formed into pellets and sold in the consumer market as nano-cellular morphology forming pellets. Previously only simple foams (greater than 1 micrometer) could be formed from pellets due to their loss of the blowing agent during transportation and storage. With the ability to produce nanocellular morphologies directly from pellets, expensive foaming equipment can be eliminated from customer cites. Addition of blowing agent at the time of extrusion is not necessary. Extrusion and injection molding infrastructure can be used in combination with the present pellets to make nanoporous foam without much modifications. The mixing of filler(s), polymer, and the gas to a homogeneous mixture enables quality foam production. The extruder or injection molding process conditions can be maintained to expand the blowing agent at the die lip to enable the formation of the desired foamed article. The nanoporous foam can provide exceptional structural (modulus and strength), thermal (thermal conductivity lower than air), dielectric (dielectric constant close to air) and/or optical (transparent and/or a translucent foam) at relatively low density of around 10 kilograms per cubic meter (kg/m$^3$) to 100 kg/m$^3$.

The present polymer composition enables the formation of pellets that can be packaged, shipped, and subsequently used to form nanocellular foam articles without the use of additional foaming equipment and/or agents. The articles can be nano porous polymer articles with a ultra low density (e.g., 10 to 50 kilograms per cubic meter (kg/m$^3$)), can be transparent foam, and can have a thermal conductivity of less than air (0.02 watts per W/mK). Although this material can be packaged in a sealed container, even if it is not sealed, the composition will, if maintained at room temperature and atmospheric pressure, retain the ability to form a nanocellular material for a period of greater than or equal to 6 months.

Ranges disclosed herein are inclusive and combinable (e.g., ranges of "up to 25 wt %, or, more specifically, 5 wt % to 20 wt %", is inclusive of the endpoints and all inner values of the ranges of "about 5 wt % to 25 wt %," etc.). "Combination" is inclusive of blends, mixtures, derivatives, alloys, reaction products, and so forth. Furthermore, the terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", "one example", "an example", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An article formed from the composition comprising:
    a polymer;
    a blowing agent cage material selected from the group consisting of zeolite imidazolate framework, metal organic framework, and combinations comprising at least one of the foregoing; and
    a blowing agent;
    wherein the article has a nanocellular morphology.

2. The article of claim 1, comprising a cell density of greater than or equal to $10^{12}$ cells/cm$^3$.

3. The article of claim 2, wherein the cell density is $10^{12}$ cells/cm$^3$ to $10^{22}$ cells/cm$^3$.

4. The article of claim 1, wherein the average pore cell size is 1 nm to 10 nm.

5. The article of claim 1, wherein the composition is in the form of pellets and the article is formed by injection molding the pellets.

6. The article of claim 1, comprising an average pore cell size of 10 nm to 780 nm.

7. The article of claim 1, wherein the polymer is selected from the group consisting of polycarbonate, polyetherimide, combinations comprising at least one of the foregoing.

8. The article of claim 1, wherein the article is a transparent.

9. The article of claim 6, wherein the average pore cell size is 10 nm to 200 nm.

10. The article of claim 1, wherein the blowing agent is present in an amount of greater than 10% gain by weight in the polymer composition.

11. A method for making a nanofoam article, comprising
    melting a polymer composition to form a molten polymer, the polymer composition comprising
        a polymer; and
        a blowing agent cage material;
    saturating the molten polymer with a blowing agent;
    inducing a thermodynamic instability; and
    foaming and forming a nanocellular morphology, transparent article.

12. The method of claim 11, wherein the polymer is selected from the group consisting of polycarbonate, polyetherimide, and combinations comprising at least one of the foregoing.

13. The method of claim 11, wherein the polymer is a thermoplastic combination comprising polyphenylene ether/polystyrene.

14. The method of claim 11, comprising an average pore cell size of 10 nm to 780 nm.

15. The article of claim 14, wherein the average pore cell size is 10 nm to 200 nm.

16. The method of claim 11, wherein the forming comprises injection molding.

17. The method of claim 11, wherein the blowing agent is supercritical carbon dioxide.

18. The method of claim 11, wherein the blowing agent cage material is selected from the group consisting of zeolite imidazolate framework, metal organic framework, and combinations comprising at least one of the foregoing.

19. An article formed by the method of claim 11, wherein the article is transparent, has a cell density of greater than or equal to $10^{12}$ cells/cm$^3$, and an average pore cell size of 10 nm to 200 nm.

20. The method of claim 11, wherein the blowing agent is present in an amount of greater than 10% gain by weight in the composition.

21. An article formed from the composition comprising:
    a polymer;
    a blowing agent cage material; and
    a blowing agent;
    wherein the article is transparent and has a nanocellular morphology and an average pore cell size of 10 nm to 200 nm.

22. The article of claim 21, wherein the blowing agent is present in an amount of greater than 10% gain by weight in the composition.

* * * * *